United States Patent
Pogorelik et al.

(10) Patent No.: US 10,601,898 B2
(45) Date of Patent: *Mar. 24, 2020

(54) MEASUREMENTS EXCHANGE NETWORK, SUCH AS FOR INTERNET-OF-THINGS (IOT) DEVICES

(71) Applicant: Intel Corporation, Santa Clara, CA (US)

(72) Inventors: Oleg Pogorelik, Lapid (IL); Alex Nayshtut, Gan Yavne (IL); Igor Tatourian, Santa Clara, CA (US); Omer Ben-Shalom, Tel Aviv (IL)

(73) Assignee: Intel Corporation, Santa Clara, CA (US)

( * ) Notice: Subject to any disclaimer, the term of this patent is extended or adjusted under 35 U.S.C. 154(b) by 76 days.

This patent is subject to a terminal disclaimer.

(21) Appl. No.: 15/846,007

(22) Filed: Dec. 18, 2017

(65) Prior Publication Data

US 2018/0205783 A1   Jul. 19, 2018

Related U.S. Application Data

(63) Continuation of application No. 14/998,104, filed on Dec. 24, 2015, now Pat. No. 9,848,035.

(51) Int. Cl.
*H04L 29/08* (2006.01)
*H04L 12/18* (2006.01)
(Continued)

(52) U.S. Cl.
CPC .............. *H04L 67/06* (2013.01); *H04L 67/12* (2013.01); *H04W 4/38* (2018.02)

(58) Field of Classification Search
USPC ......................................... 709/217, 204, 219
See application file for complete search history.

(56) References Cited

U.S. PATENT DOCUMENTS

| | | | |
|---|---|---|---|
| 9,848,035 B2* | 12/2017 | Pogorelik | ............... H04L 67/06 |
| 2003/0104816 A1* | 6/2003 | Duplessis | ............. H04W 36/14 |
| | | | 455/448 |

(Continued)

FOREIGN PATENT DOCUMENTS

| WO | WO2014/187850 A1 | 11/2014 |
|---|---|---|
| WO | WO2015-127070 A1 | 8/2015 |

OTHER PUBLICATIONS

International Search Report and Written Opinion dated Mar. 8, 2017 for International Application No. PCT/US2016/063532, 14 pages.

(Continued)

*Primary Examiner* — Jude Jean Gilles
(74) *Attorney, Agent, or Firm* — Schwabe, Williamson & Wyatt, P.C.

(57) ABSTRACT

Measurement exchange networks and protocols to exchange measurements of a parameter amongst devices (e.g., IoT devices), select the best measurement(s), accuracy/precision-wise, and determine a process variable for a control system based on the selected best measurement(s). A device may select a peer-provided best measurement to output as the process variable in place of a local measurement, and/or compute the process variable from multiple best measurements (e.g., local and/or peer-provided measurements). Metadata may be used to select a measurement(s) and/or to increase reliability/trust of exchanged data. In this way, each device of an exchange group/network may obtain the highest measurement accuracy of all available collocated sensors with little or no additional processing or cloud connectivity. A best measurement(s) may be selected based on measurement quality specifications extracted from metadata, measurement qualities computed from measurements of respective sensors, locations/proximities of the sensors, a policy (ies), and/or device IDs (e.g., extracted from metadata).

20 Claims, 10 Drawing Sheets

(51) Int. Cl.
*H04W 4/38* (2018.01)
*G06F 17/18* (2006.01)
*G06F 3/14* (2006.01)

(56) References Cited

U.S. PATENT DOCUMENTS

| | | |
|---|---|---|
| 2010/0017138 A1 | 1/2010 | Brady et al. |
| 2011/0311690 A1* | 12/2011 | Franzolin .................. F24C 7/08 |
| | | 426/231 |
| 2012/0197911 A1 | 8/2012 | Banka et al. |
| 2013/0022462 A1 | 1/2013 | Lang et al. |
| 2013/0201316 A1* | 8/2013 | Binder .................... H04L 67/12 |
| | | 348/77 |
| 2013/0219046 A1* | 8/2013 | Wetterwald ............. H04L 45/38 |
| | | 709/224 |
| 2014/0019397 A1 | 1/2014 | Alexander |
| 2014/0081473 A1* | 3/2014 | Bengtson ................. G05B 9/02 |
| | | 700/287 |
| 2014/0101255 A1 | 4/2014 | Pal et al. |
| 2014/0297210 A1* | 10/2014 | Kamel ................ H02J 13/0006 |
| | | 702/62 |
| 2014/0324230 A1* | 10/2014 | Zhao ........................ F24F 11/89 |
| | | 700/276 |
| 2014/0379156 A1* | 12/2014 | Kamel ..................... G05F 1/66 |
| | | 700/291 |
| 2014/0379804 A1* | 12/2014 | Wang .................... H04L 67/104 |
| | | 709/204 |
| 2015/0016359 A1* | 1/2015 | Wang .................... H04W 74/04 |
| | | 370/329 |
| 2015/0019717 A1* | 1/2015 | Li ....................... H04L 67/1085 |
| | | 709/224 |
| 2015/0089243 A1 | 3/2015 | Veugen |
| 2015/0127733 A1* | 5/2015 | Ding ....................... H04W 4/08 |
| | | 709/204 |
| 2015/0257203 A1 | 9/2015 | Okada et al. |
| 2015/0334181 A1* | 11/2015 | Jimenez .............. H04L 67/2861 |
| | | 709/204 |
| 2015/0341739 A1 | 11/2015 | Jin et al. |
| 2016/0059412 A1* | 3/2016 | Oleynik ................... B25J 9/163 |
| | | 700/257 |
| 2016/0080486 A1* | 3/2016 | Ram ..................... H04W 4/023 |
| | | 709/205 |
| 2016/0095013 A1 | 3/2016 | Faivishevsky et al. |
| 2016/0231192 A1* | 8/2016 | Hammerschmidt .. G01L 9/0072 |
| 2016/0283254 A1 | 9/2016 | Hill et al. |
| 2017/0093915 A1* | 3/2017 | Ellis ........................ H04L 63/20 |
| 2017/0102978 A1 | 4/2017 | Pallath et al. |
| 2017/0177302 A1 | 6/2017 | Tan et al. |
| 2019/0325376 A1* | 10/2019 | Khasis ............... G01C 21/3492 |

OTHER PUBLICATIONS

Extended European Search Report dated May 27, 2019 for European Patent Application No. 16879765.2, 11 pages.

* cited by examiner

MEASUREMENTS EXCHANGE NETWORK, SUCH AS FOR INTERNET-OF-THINGS (IOT) DEVICES

RELATED APPLICATION

This application is a continuation of U.S. application Ser. No. 14/998,104, filed Dec. 24, 2015, entitled "Measures Exchange Network, such as for Inter-of-Things (IoT) Devices". The Specification (including the drawings) of U.S. Ser. No. 14/998,104 Application is hereby fully incorporated by reference.

BACKGROUND

A personal area network (PAN) is a computer network used for data transmission among devices such as computers, telephones, and personal digital assistants. PANs can be used for communication among the personal devices themselves (intrapersonal communication), or for connecting to a higher-level network and the Internet.

Bluetooth (Classic Bluetooth) is a wireless technology standard for exchanging data over short distances, using short-wavelength UHF radio waves in the ISM band from 2.4 to 2.485 GHz, from fixed and mobile devices, and PANs.

Bluetooth low energy, also referred to as Bluetooth LE, BLE, Bluetooth Smart, is a wireless PAN technology designed and marketed by the Bluetooth Special Interest Group in healthcare, fitness, beacon, security, and home entertainment industries. Compared to Classic Bluetooth, Bluetooth low energy is intended to provide reduced power consumption and cost while maintaining a similar communication range.

An "Internet of Things" (IoT) network, refers to a network of devices embedded with electronics (i.e., circuitry and/or processors and memory), sensors, and connectivity to enable the devices to be controlled over a communication network. An IoT network is a network of addressable connected devices.

Due to cost constraints, an IoT device may be configured with a relatively low quality (e.g., relatively accuracy and/or precision) sensor. Compensation techniques include averaging of sequential measurements and obtaining alternative measurements from a cloud service. Such compensation techniques may increase complexity, manufacturing costs, and/or power consumption, and may not be suitable for relatively inexpensive, low power, and/or isolated IoT applications.

BRIEF DESCRIPTION OF THE DRAWINGS

For illustrative purposes, one or more features disclosed herein may be presented and/or described by way of example and/or with reference to one or more drawing figured listed below. Methods and systems disclosed herein are not, however, limited to such examples or illustrations.

Figure 1:
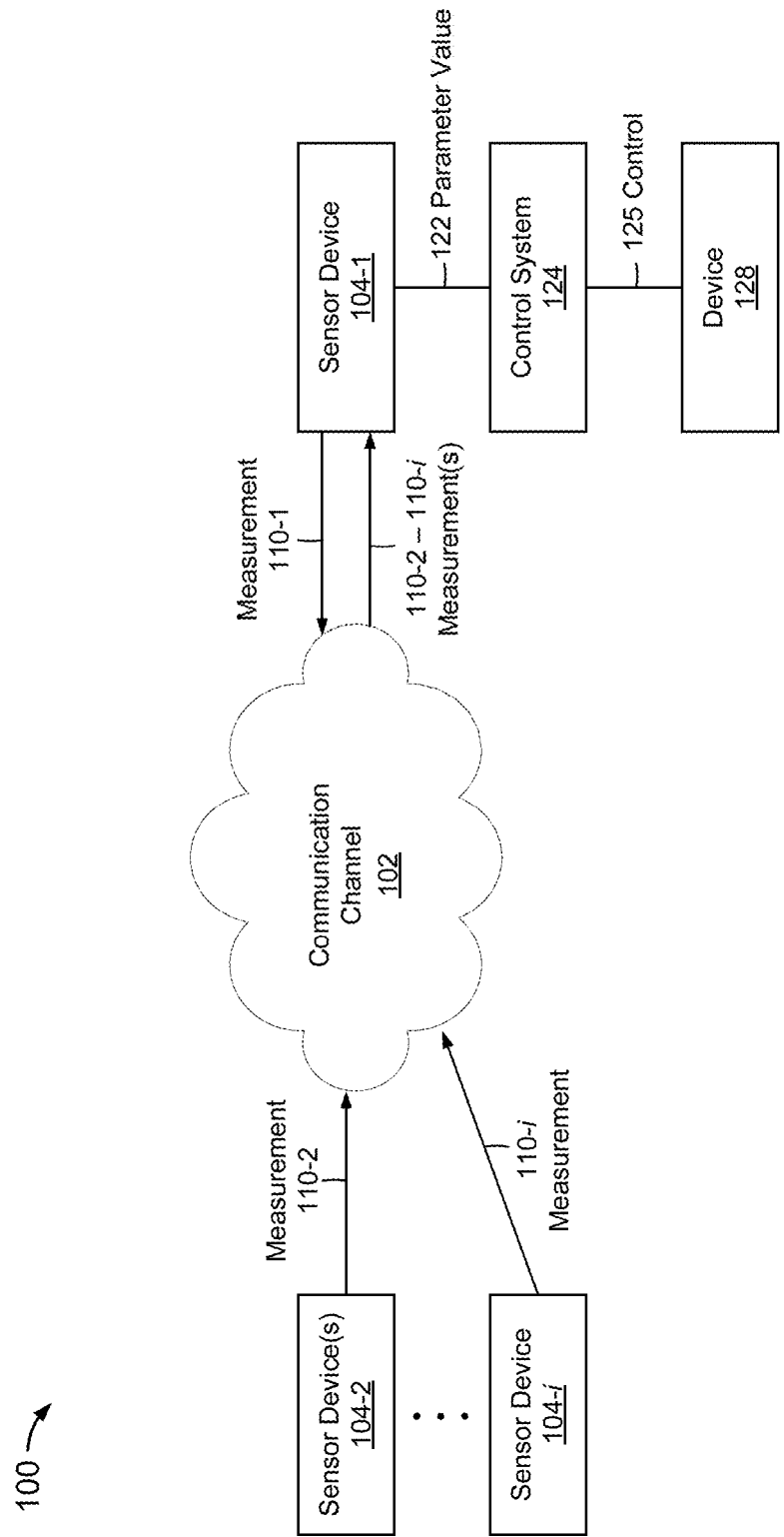
FIG. 1 is a block diagram of a system that includes a first sensor device to exchange measurements of a parameter with one or more other sensor devices over a communication channel, and to determine a parameter value or process variable for a control system based on the best measurement(s), accuracy/precision-wise.

In the drawings, the leftmost digit(s) of a reference number identifies the drawing in which the reference number first appears.

DETAILED DESCRIPTION

Unless specified otherwise herein, a quality (e.g., as in, a measurement quality, a measure of quality, a sensor quality, measurement quality information, and variations/substitutions thereof), may be refer to and/or may be expressed and/or specified in terms of, without limitation, accuracy, precision, sensitivity, tolerance, reliability, resolution, granularity, comprehensiveness, variation, invariance, deviation, uncertainty, mean, average, error, standard error, measurement frequency, sensor proximity, and/or power consumption.

Measurement quality can also be specified or determined in terms of and from the following sensor or sensor management data: measured or sensed data variance; periodic measurement variance; historical or trend data stored by the systems contemplated herein; new sensors brought on line that lack historical trend data, but which are considered more precise or accurate; uptime/downtime or other operational reliability parameter; sensor type; sensor age; sensor variance as it correlates to time of day or environmental conditions; correlation of sensor data with other proximate sensors; correlation with other similarly situated sensors not proximate to the first sensor or group of sensors; correlation with sensors recently calibrated or manually verified data stored in the system for determining quality; or combinations thereof.

FIG. 1 is a block diagram of a system 100 that includes a sensor device 104-1 to exchange measurements of a parameter with one or more other sensor devices 104-2 through 104-$i$ over one or more communication channels 102, and to determine a parameter value 122 based on one or more of the measurements. Devices 104 and communication channel(s) 102 may also be collectively referred to herein as a device network. Devices 104 or a subset thereof may represent IoT devices.

Measurements 110 may include and/or relate to, without limitation, temperature, pressure, humidity, light intensity, motion, and/or other environmental parameter(s).

System 100 may include a control system 124 to control a device 128 with a control 125 based on a parameter value 122. Device 128 may include, without limitation, a household appliance, a heating, air conditioning, and/or ventilation (HVAC) device, a fire suppression device, an alarm/security device, and/or a medical device. Example configurations of control system 124 are provided further below.

Sensor device 104-1 may be configured to select a subset (i.e., one or more) of measurements 110, and to determine parameter value 122 based on the selected subset of measurements. One or more of devices 104-2 through 104-$i$ may be configured to determine respective parameter values in a similar fashion.

Sensor device 104-1 may be configured to select from amongst measurements 110 to provide parameter value 125 with the highest degree of accuracy, precision, reliability, and/or comprehensiveness attainable within system 100.

In an embodiment, sensor device 104-1 is configured to select a best one of measurements 110 (e.g., the most accurate, precise, reliable, and/or comprehensive), to output as parameter value 122.

In another embodiment, sensor device 104-1 is configured to select multiple measurements 110, and to compute parameter value 122 based on the multiple selected measurements.

In either of the foregoing embodiments, sensor device 104-1 may be configured to select a subset of one or more measurements 110 based on respective measures of quality.

Sensor device 104-1 may be configured to determine measures of quality from specifications of the respective sensor devices, and/or to compute measures of quality from measurements of the respective sensor devices.

Sensor device 104-1 may, for example, be configured to extract measures of quality for other sensor devices 104 from metadata of respective measurements 110. Alternatively, or additionally, sensor device 104-1 may be configured to extract device identifiers (device IDs) from the metadata, and to retrieve sensor quality information of the respective sensor devices based on the device IDs.

Regarding computation of measures of quality, sensor device 104-1 may be configured to compute a statistical measure of quality for one or more other sensor devices 104, based on measurements of the respective sensor devices. As an example, and without limitation, sensor device 104-1 may be configured to compute a statistical measure variability (i.e., extent of changes or variation in measurements of a sensor device), over a relatively short period of time (i.e., a time period in which variations should be relatively small). Sensor device 104-1 may be configured a statistical measure of variability as a standard deviation in a sequence of measurements of a sensor device. In this example, sensor device 104-1 may be further configured to select a measurement 110 of a sensor device 104 for which the standard deviation is lower than the standard deviation of one or more other sensor devices 104. Techniques to compute a measure of quality are not limited to examples herein.

Sensor device 104-1 may be configured to select a subset of measurements 110 based at least in part on a policy, which may be based on pre-determined measures of quality of one or more of sensor devices 104 and/or other factors. A policy may, for example, specify that measurements from sensor device 104-2 are to be output as parameter value 122 (i.e., substituted for measurement 110-1), when such measurements are available. The policy may specify an alternative action for situations in which measurements from sensor device 104-2 are unavailable.

Sensor device 104-1 may be configured to select a subset of measurements 110 and/or determine parameter value 122 based on the selected subset of measurements, autonomously.

Sensor devices 104, or a subset thereof, may include wire and/or wireless communication devices to exchange measurements 110 over a wired and/or wireless communication channel 102, in accordance with one or more communication and/or networking protocols.

Sensor devices 104 may, for example, be configured to exchange measurements 110 within a wireless personal area network (WPAN) (e.g., Bluetooth and/or Bluetooth low energy network), a wireless local area network (WLAN), a wireless mesh network, a wireless metropolitan area network (WMAN), a wireless wide area network (WWAN), and/or a global area network (GAN), an isolated wireless network (e.g., inaccessible to/from the Internet), a proprietary wireless network, and/or an open wireless network (e.g., accessible to/from the Internet). System 100 is not limited to these examples.

Sensor devices 104, or a subset thereof, may be configured to exchange measurements 110 as, or within datagrams or data packets, in accordance with a packet-based or packet switching protocol. The packet-based protocol may include a connection-based (i.e., handshake) protocol, such as a transmission control protocol/Internet protocol (TCP/IP), and/or a connection-less (i.e., non-handshake) protocol, such as a user datagram protocol (UDP). A connection-less protocol may reduce design/manufacturing complexity/costs, processing overhead, and/or power consumption of system 100, relative to a connection-based protocol.

Communication channel 102 may include a device-to-device channel, and/or a broadcast channel (e.g., a one-to-many channel). Sensor device 104-1 may, for example, be configured to transmit a single instance of a datagram or data packet to a broadcast address that is accessible to sensor devices 104-2 through 104-$i$, and/or to respective addresses (e.g., media access controller (MAC) addresses), of respective sensor devices 104-2 through 104-$i$. Sensor device 104-1 may be further configured to listen for broadcasts of sensor devices 104-2 through 104-$i$. Sensor device 104-1 may include, for example, a UDP listener (e.g., a UDP socket), to listen for UDP traffic (i.e., datagrams/packets), on a specified port(s).

Where sensor device 104-1 includes a listener to listen for broadcasts of other sensor devices, sensor device 104-1 may be further configured to selectively place one or more other components of sensor device 104-1 in a reduced-power consumption mode and/or an inactive state during periods of inactivity (i.e., between receipt/processing of measurements 110), and to wake the other component(s) when a broadcast is detected.

System 100 may further include a network device, such as a network switch and/or router to manage communications amongst sensor devices 104.

System 100 may further include an administrator device, such as a network server to configure and/or manage one or more of sensor devices 104 and/or to manage communications amongst sensor devices 104 (e.g., to provision policies and/or algorithms).

In an embodiment, sensor devices 104 are configured to broadcast respective messages 100 and to listen for broadcasts of other devices, without network switching and/or routing hardware, and/or without a network administrator device. In this example, communication channel 102 may defined by solely by (i.e., may consist of), a communication medium (e.g., air and/or wire), and each sensor device 104 may operate autonomously. This may reduce design/manufacturing complexity/costs, processing overhead, and/or power consumption of system 100.

Sensor devices 104 may be configured and/or selected for deployment to isolate sensor devices and communication channel 201 from other communication channel(s)/networks, such as other device networks and/or the Internet (i.e., to preclude communications between devices 104 and devices of other networks). This may reduce design/manufacturing complexity/cost, processing overhead, and/or power consumption of system 100.

Sensor devices 104 may, for example, include relatively inexpensive communication devices, in terms of complexity, cost, and/or power consumption, which are sufficient to communicate with one another and insufficient to communicate with more-expensive communication devices. As an example, communication devices of sensor devices 104 may be configured to broadcast in accordance with UDP and listen for UDP broadcasts, and may be incapable (e.g., lack hardware, such as a network interface controller), to communicate with more-complex protocols (e.g., TCP/IP).

Example configurations of control system 124 are provided below. Control system 124 is not limited to examples herein.

Control system 124 may include an open-loop control system to generate control 125 based primarily and/or solely on parameter value 122.

Control system 124 may include a closed-loop or feedback-controlled control system to generate control 125 based on parameter value 122, in combination with a current and/or prior value/state of control 125 and/or other feedback/correction(s).

Control system 124 may include a logic controller, an on-off controller, an on-off negative feedback controller, a linear controller, a proportional controller, a fuzzy logic based controller, other controller type(s), and combination thereof.

A logic controller may include integrated circuity/logic (e.g., ladder logic), and/or an instruction processor, such a programmable logic controller (PLC) and/or microcontroller.

An on-off negative feedback controller may be configured to enable and/or disable a task (i.e., enable or disable control 125), when a process variable (i.e., parameter value 122), exceeds a setpoint, or based on a difference between parameter value 122 and a threshold setting for parameter value 122. For example, a thermostat may be configured to turn-on a heater when parameter value 122 falls below a setpoint, and/or to turn-on an air conditioner when parameter value 122 rises above a setpoint. As another example, a pressure-actuated switch may be configured to turn-on a compressor when a parameter value 122 (i.e., as a pressure measurement), drops below a threshold setpoint. Other examples include, without limitation, refrigerators, and vacuum pumps.

A linear control system may be configured to use linear negative feedback to generate control 125 to maintain parameter value 122 within an acceptable operating range, based on one or more other variables. In this example, control 125 may be a time-varying control (e.g., an amplitude-varying signal), and or a duty-cycle regulated binary control (e.g., regulating an on/off duty cycle with pulse-width modulation).

A proportional negative-feedback control system may be configured to provide control 125 based on a difference or error between a setpoint and parameter value 122. In this example, control 125 may be directly proportional to the difference/error, to reduce the difference/error and avoid positive feedback. An amount/extent of control 125 is based on a gain or sensitivity of the control system.

Further to the description above, sensor device 104-1 may represent and/or may be configured as an IoT device.

System 100 may be configured as an isolated network of sensor devices (i.e., without Internet/cloud connectivity).

System 100 may represent and/or may be configured as a peer-to-peer (P2P) device network.

System 100, where sensor device 104-1 is configured to select best-available measurement(s) from measurements of multiple sensor devices, may require relatively little processing overhead relative to a network of devices that employ conventional techniques, such as averaging sequences. The reduced processing overhead of system 100 may provide cost and/or power savings relative to a conventional device network.

System 100 may reduce deployments costs of a device network (e.g., of an IoT network), in that one good sensor may improve operations of multiple devices. In FIG. 1, for example, to reduce costs, sensor devices 104-1 and a subset of sensor devices 104-2 through **104-*i* may include relatively inferior sensors (i.e., sensors measure a parameter with relatively poor accuracy, precision, and/or frequency), provided that at least of one of sensor devices 104-2 through 104-*i* include a relatively superior sensor (i.e., to measure the parameter with suitable accuracy, precision, and/or frequency). In this way, sensor device 104-1 and remaining ones of sensor devices 104-2 through 104-*i* may substitute and/or augment respective measurements of the parameter with measurements from the superior sensor device. Further examples are provided further below with reference to FIG. 2**.

System 100 may scale for relatively large numbers of sensor devices.

System 100 may simplify data processing in that it may be deployed without modification of a gateway or backend software.

System 100 may configured to include wearable devices/garments and/or body area networks.

Sensor devices 104 may be configured to broadcast measurement packets with metadata that includes sensor type, precision, measurement frequency, and/or security controls. Sensor devices 104, or a subset thereof, may be further configured to listen for broadcasts of other sensor devices, and to identify information (e.g., measurements) that correspond its own sensor type from metadata of the respective broadcasts.

Sensor devices 104 may be selected for deployment to configure communication channel 102 for a desired physical connectivity range. For example, where close proximity of sensor devices is desired for sharing measurements, sensor devices having relatively short-range wireless communication devices (e.g., Bluetooth/Bluetooth Low Energy), may be deployed. Sensor devices having longer-range wireless communication devices (e.g., WiFi), may be deployed for longer-range applications.

Sensor device 104-1 may be configured to substitute its own measurements with better quality data, or to augment its measurements with a measurement(s) of another device(s), such as by computing a mean and/or other data transformation(s).

Sensor device 104-1 may be configured to perform one or more functions in a trusted execution environment (TEE), such as within an access-protected region of a memory device, with a dynamic application loader, and/or with software guard extensions. A TEE may provide and/or improve integrity and/or security.

Sensor device 104-1 may be configured to broadcast measurements to include a device ID (e.g., a MAC address) and/or a running frame counter, and/or to sign broadcasts with a hardware-based key for device authentication/attestation. This may to provide and/or enhance integrity and/or security.

A policy may be configured to permit enabling and/or disabling broadcasting and receiving of data by sensor device 104-1.

A policy may permit may be configured to modify an algorithm of sensor device 104-1 by which better precision data is used.

Sensor device 104-1 may include a best-measurement selection algorithm, which may be configured as a stand-alone procedure to run/executed autonomously by sensor device 104-1. Alternatively, a server side configuration may be employed. For example, a management server may specify which information should be selected (e.g., captured by a local sensor device and/or broadcast by other sensor devices).

Figure 2:
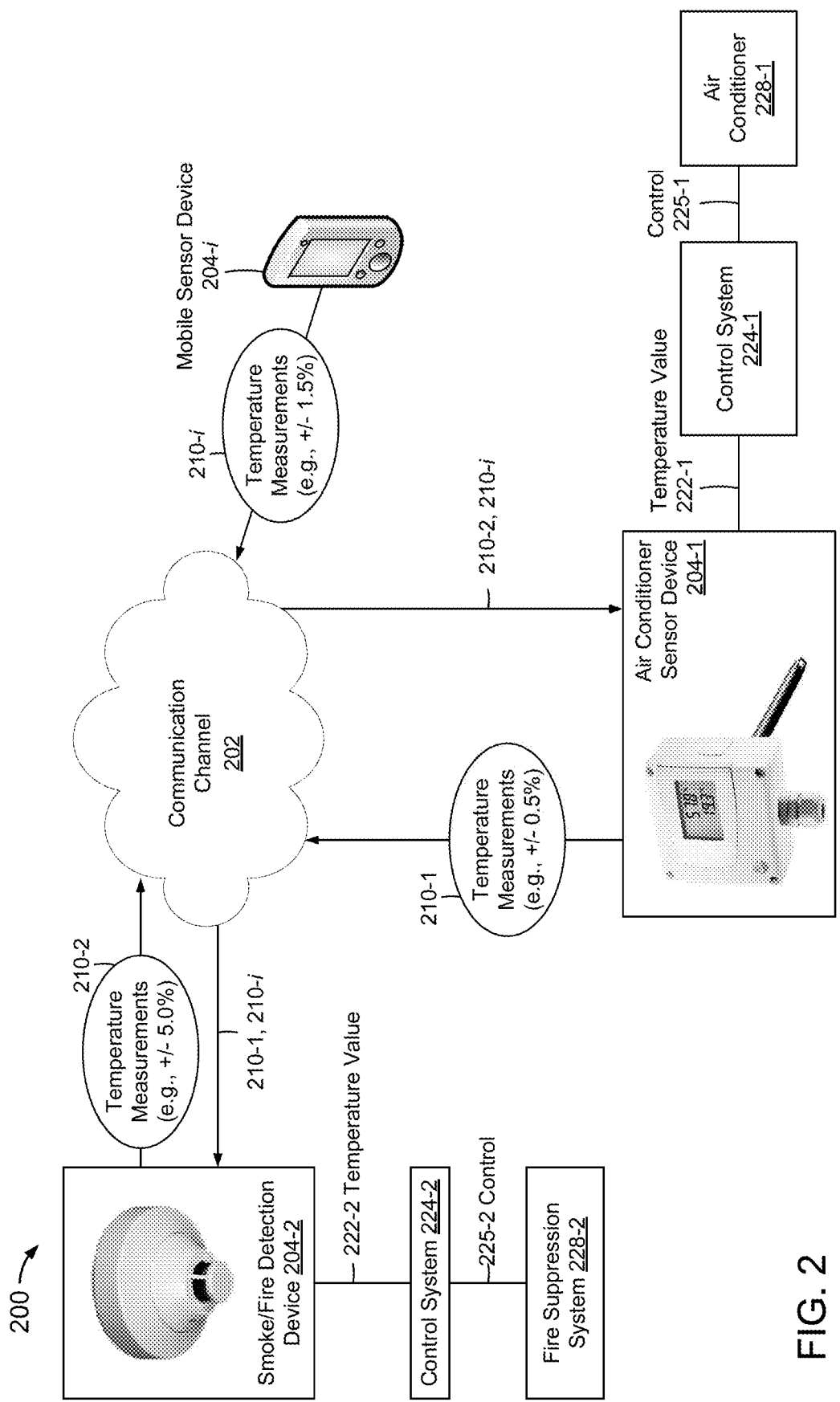
FIG. 2 is an illustration of a system that includes sensor devices to exchange temperature measurements over a communication channel.

FIG. 2 is an illustration of a system 200 that includes sensor devices 204 to exchange temperature measurements 210 over a communication channel 202, such as described above with respect to FIG. 1.

Sensor devices 204 may be referred to as co-located with respect to one another when sensor devices 204 are in communication with/over communication channel 202 (e.g., when sensor devices 204 are within a wireless range of a wireless communication channel 202).

In the example of FIG. 2, sensor devices 204 include an air conditioner sensor device 204-1 to sense and provide temperature measurements 210-1 over channel 202, a smoke/fire sensor device 204-2 to sense and provide a temperature measurements 210-2 over network 202, and a mobile sensor device 204-i to sense and provide temperature measurements 210-i over network 202.

Air conditioner sensor device 204-1 is further configured to receive temperature measurements 210-2 and 210-i of sensor devices 204-2 and 204-i, and to determine a temperature value 222-1 based on one or more of temperature measurements 210-1, 210-2, and 210-i, such as described above with respect to sensor device 104-1 in FIG. 1.

Smoke/fire sensor device 204-2 is further configured to receive temperature measurements 210-1 and 210-i of sensor devices 204-1 and 204-i, and to determine a temperature value 222-2 based on one or more of temperature measurements 210-1, 210-2, and 210-i, such as described above with respect to sensor device 104-1 in FIG. 1.

System 200 further includes an air conditioning control system 224-1 to generate a control 225-1 based at least in part on temperature value 222-1, and to control an air conditioner 228-1 with control 225-1.

System 200 further includes a fire suppression control system 224-2 to generate a control 225-2 based at least in part on temperature value 222-2, and to control a fire suppression system 228-2 with control 225-2.

Air conditioning control system 224-1 and/or fire suppression control system 224-2 may be configured as described above with respect to control system 124-1 in FIG. 1.

In the example of FIG. 2, temperature measurements 210-1 of air conditioner sensor device 204-1 are illustrated as accurate within +/−0.5%. Temperature measurements 210-2 of smoke/fire detection device 204-2 are illustrated as accurate within +/−5.0%. Temperature measurements 210-i of mobile sensor device 204-i are illustrated as accurate within +/−1.5%.

In this example, where air conditioner sensor device 204-1 is configured to select one of temperature measurements 210 to output as temperature value 221-1, air conditioner sensor device 204-1 may output its own temperature measurements 210-1 as temperature value 221-1.

Similarly, where smoke/fire sensor device 204-2 is configured to select one of temperature measurements 210 to output as temperature value 221-2, smoke/fire sensor device 204-2 may substitute temperature measurements 210-1 of air conditioner sensor device 204-1 in place of its own temperature measurements 210-2.

If temperature measurements 210-1 of air conditioner sensor device 204-1 were unavailable to smoke/fire sensor device 204-2, smoke/fire sensor device 204-2 may elect to use temperature measurements 210-i of mobile device 204-i in place of temperature measurements 210-2, or in combination with temperature measurements 210-2. A decision by smoke/fire sensor device 204-2 to use temperature measurements 212-i of mobile device 204-i, may be based in part on physical proximity of mobile device 204-i to smoke/fire sensor device 204-2.

In other embodiments, a sensor device may be configured as part of a medical sensor/control device, a biometric sensor/control device, an environmental sensor/control device, an automobile sensor/control device, biological sensor/control device, (e.g., a heart-monitoring implant, biochip transponders on farm animals, automobile built-in sensors, field operation devices that assist fire-fighters in search and rescue), smart thermostat systems, and/or household appliances (e.g., washer/dryers), configured to utilize Wi-Fi for remote monitoring. Sensor devices and parameter measurements are not limited to examples herein.

Figure 3:
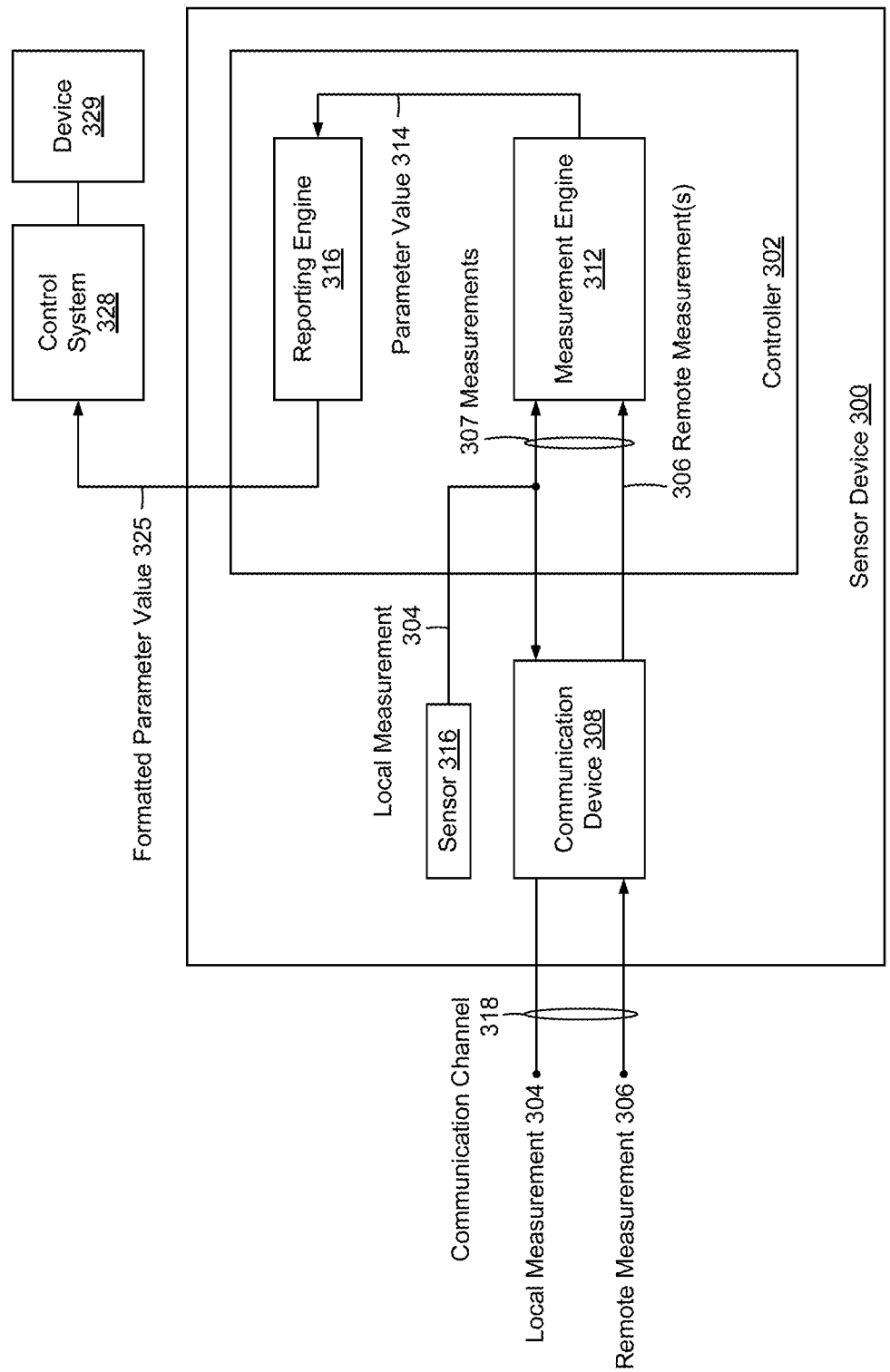
FIG. 3 is a block diagram of a sensor device to exchange measurements of a parameter with one or more other devices, and to determine a value of the parameter based on one or more of the measurements.

FIG. 3 is a block diagram of a sensor device 300 to exchange measurements of a parameter with one or more other devices, and to determine a value of the parameter based on one or more of the measurements.

Sensor device 300 includes a sensor 316 to provide a local measurement 304 of the parameter.

Sensor device 300 further includes a communication device 308 to interface between sensor device 300 and one or more other sensor devices over a communication channel 318. Communication device 308 may include a wired and/or wireless transceiver.

Communication device 308 is configured to transmit local measurement 304 over communication channel 318, and to receive a remote measurement 306 of the parameter from one or more remote sensor devices over communication channel 318, such as described in one or more examples above.

Local measurement 304 and remote measurement(s) 306 may be collectively referred to herein as measurements 307.

A controller 302 includes a measurement engine 312 to determine a parameter value 314 based on one or more of measurements 307, such as described above with respect to parameter value 122 in FIG. 1.

Controller 302 further includes a reporting engine 316 to report parameter value 314 to a network server and/or to a control system 328 configured to control a device 329, such as described in one or more examples above. Reporting engine 316 may be configured to format parameter value 314 as formatted parameter value 325. In an embodiment, control system 326 is configured within controller 302.

Controller 302 may further include a donation broadcaster and/or a broadcast listener, such as described below with reference to FIG. 4.

Figure 4:
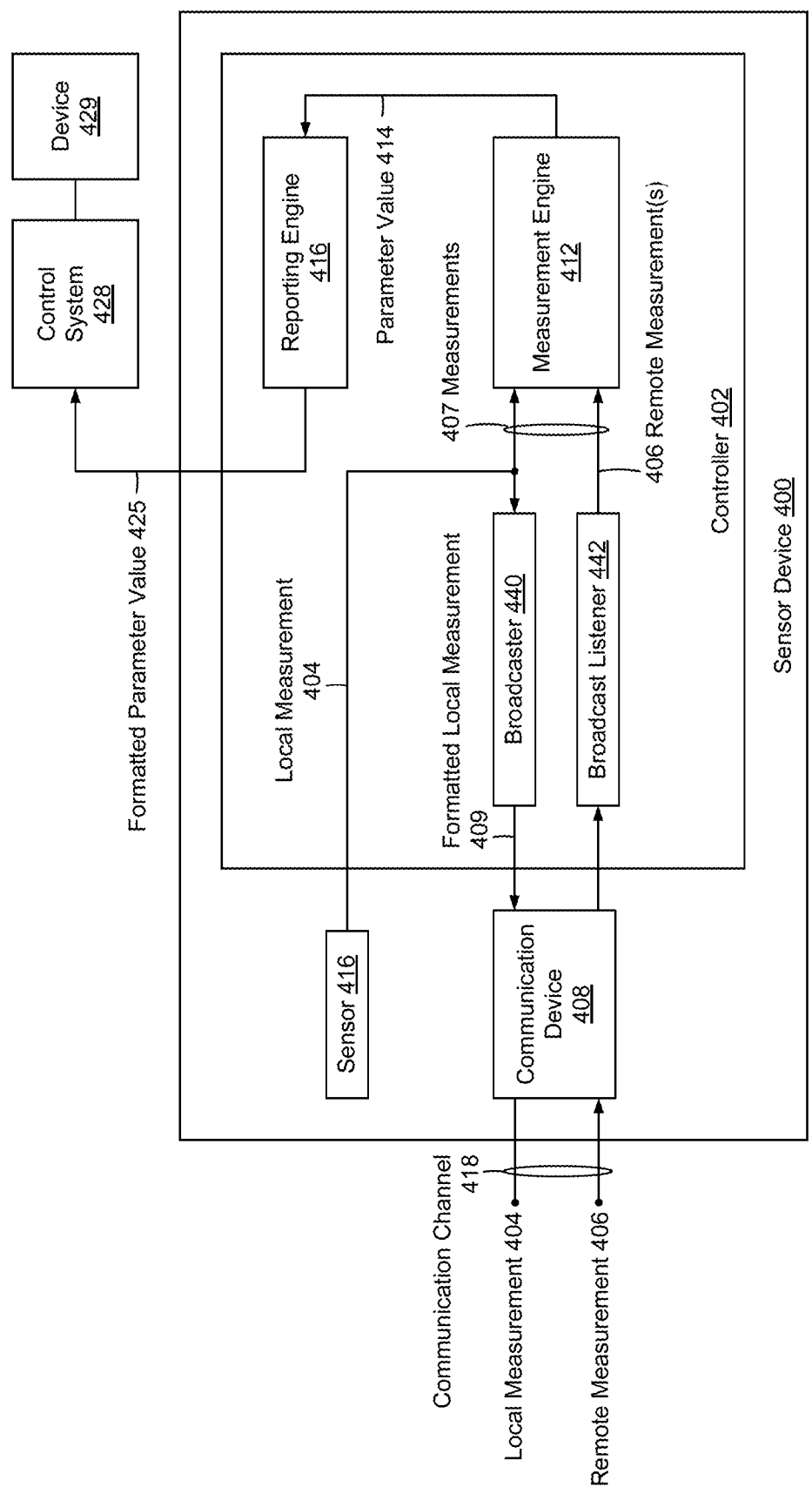
FIG. 4 is a block diagram of another sensor device to exchange measurements of a parameter with one or more other devices, and to determine a value of the parameter based on one or more of the measurements.

FIG. 4 is a block diagram of a sensor device 400 to exchange measurements of a parameter with one or more other devices, and to determine a value of the parameter based on one or more of the measurements.

Sensor device 400 includes a sensor 416 to provide a local measurement 404 of the parameter.

Sensor device 400 further includes a communication device 408 to interface between device 400 and one or more other sensor devices over a communication channel 418. Communication device 408 may include a wired and/or wireless transceiver.

A controller 403 includes a donation broadcaster 440 to select and/or format local measurement 404 for transmission over communication channel 418 as formatted local measurement 409. Donation broadcaster 440 may include a network filter to select measurement 110 from multiple local measurements, and/or to designate a destination port. The destination port may be determined, configured, and/or selected by an administrator of sensor device 400, based on common practices within a sensor community and/or other factors.

Donation broadcaster 440 may include a secure broadcast module to translate local measurement 404 into a desired/required format, sign the measurement/packet with a hardware-based signature, embed information as metadata, and send formatted local measurement 409 over communication channel 418 through communication device 408. Embedded information may include a frame counter and/or a sensor specification (e.g., device ID, sensor/parameter type, accuracy, precision, and/or frequency).

Controller 402 further includes a broadcast listener 442 to listen for broadcasts of remote measurements of the parameter over communication channel 418, such as described in one or more examples above.

Controller 402 further includes a measurement engine 412 to receive local measurement 404 and remote measurement 406 (collectively referred to herein as measurements 407), and to determine a parameter value 414 based on one or more of measurements 407, such as described above with respect to parameter value 122 in FIG. 1.

Controller 402 further includes a reporting engine 416 to report parameter value 414 to a network server and/or to a control system 428 configured to control a device 429, such as described in one or more examples above. Reporting engine 416 may be configured to format parameter value 414 as formatted parameter value 425. In an embodiment, control system 426 is configured within controller 402.

Figure 5:
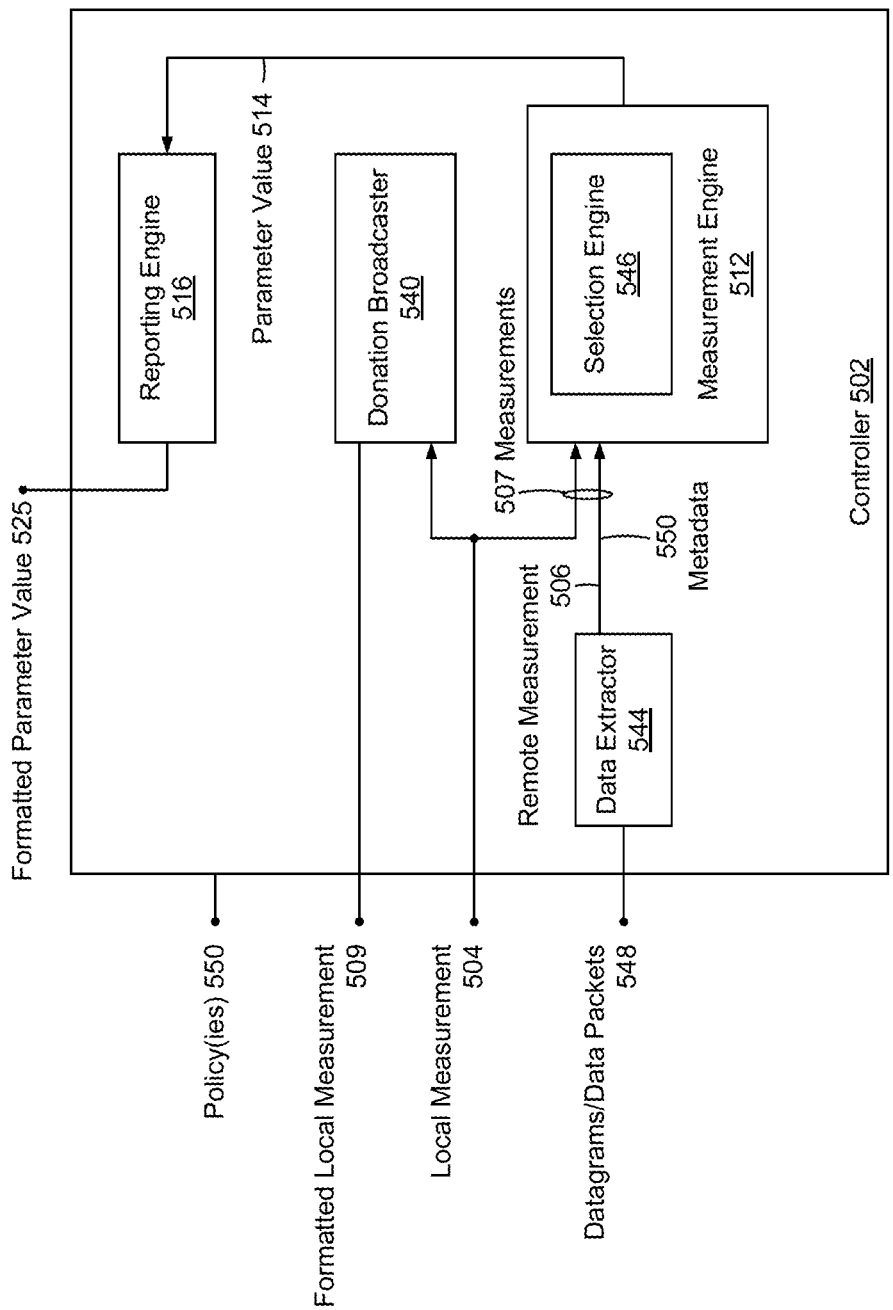
FIG. 5 is a block diagram of a sensor device controller that includes a donation broadcaster to select and/or format a local measurement of a parameter.

FIG. 5 is a block diagram of a sensor device controller 502 that includes a donation broadcaster 540 to select and/or format a local measurement 504 of a parameter as formatted local measurement 509, such as described above with respect to donation broadcaster 440 in FIG. 4.

Controller 502 may include a broadcast listener to listen for datagrams/data packets 548 broadcast by other sensor devices, such as described above with respect to broadcast listener 442 in FIG. 4.

Controller 502 further includes a data extractor 544 to extract remote measurement(s) 506 of the parameter and associated metadata 550 from datagrams/data packets 548.

Metadata 500 may include, without limitation, a device identifier (device ID), sensor location information, and/or a sensor specification, which may include sensor/parameter type, measurement/sensor quality, and/or security controls/features.

Controller 502 further includes a measurement engine 512 to receive local measurement 504 and remote measurement(s) 506 (collectively referred to herein as measurements 507), and metadata 550.

Measurement engine 512 includes a selection engine 546 to select one or more of measurements 507 based on metadata 550 and/or other information.

In an embodiment, selection engine 546 is configured to select a subset of measurements 507 based on extracted sensor quality information within metadata 550, and/or computed measurement quality information, such as described in one or more examples above.

In an embodiment, selection engine 546 is configured to select a subset of measurements 507 based at least in part on a device ID within metadata 550 and a policy 550, which may favor measurements of one sensor device over measurements of another sensor device.

In an embodiment, controller 502 is configured determine a proximity of a sensor of remote measurement 506 relative to a sensor of local measurement 504, and selection engine 546 is configured to select a subset of measurements 507 based at least in part on the proximity.

A sensor device as disclosed herein may be configured to identify a measurement of a parameter of interest from amongst measurements of multiple parameters received over a communication channel, such as described below with reference to FIG. 6.

Figure 6:
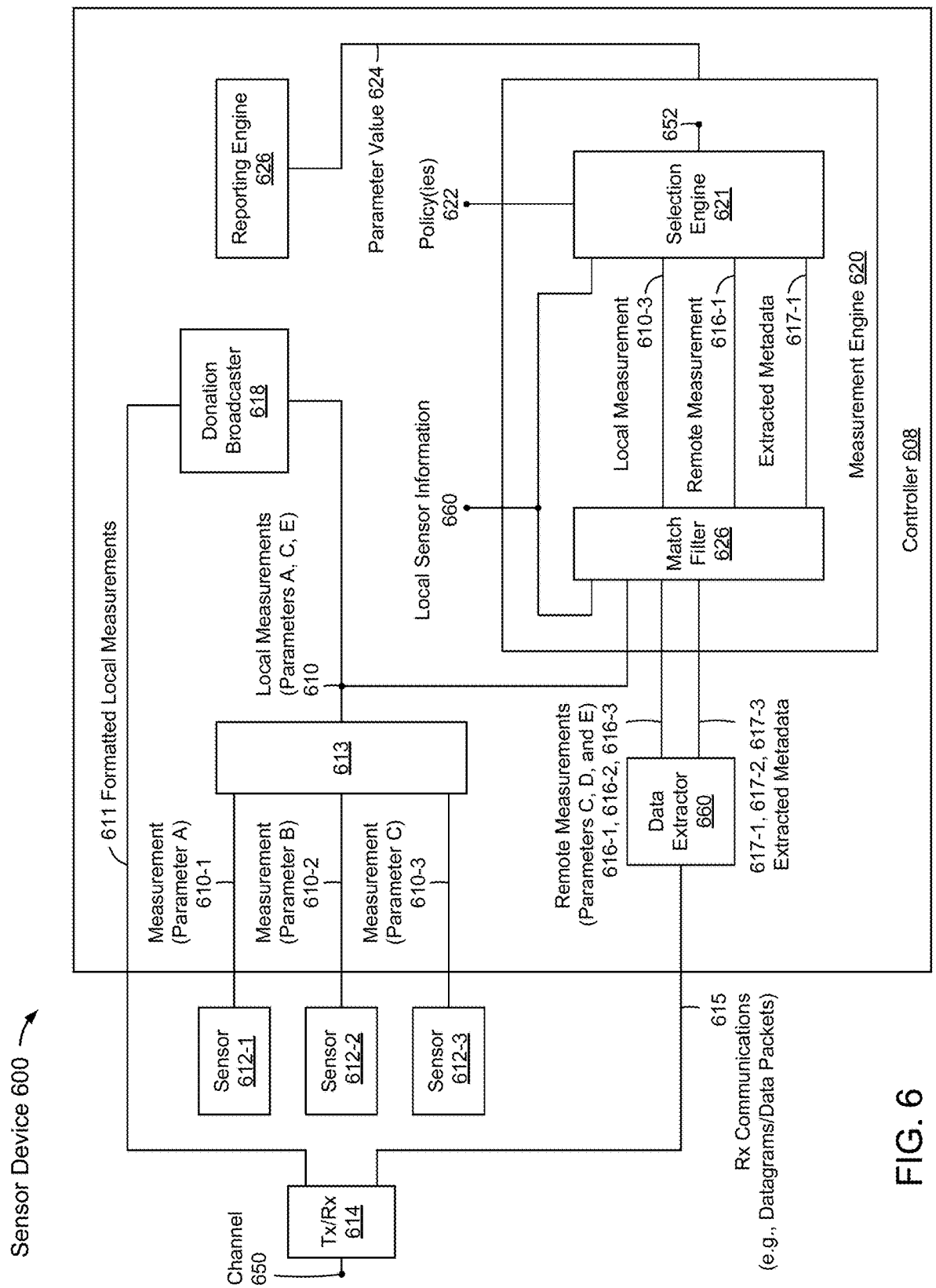
FIG. 6 is a block diagram of another sensor device to exchange measurements of parameters over a communication channel.

FIG. 6 is a block diagram of a sensor device 600 to exchange measurements of parameters over a communication channel 660.

Sensor device 600 includes sensors 612-1, 612-2, and 612-3 to provide measurements 610-1, 610-2, and 612-3 of respective parameters A, B, and C. Sensors 612 and measurements 610 may also be referred to herein as local sensors and local measurements.

Sensor device 600 further includes a controller 608.

Controller 608 includes a measurements collector 613 to interface between local sensors 612 and a measurement engine 620, and between local sensors 612 and a donation broadcaster 618. Donation broadcaster 618 may be configured to select and/or format one or more of local measurements 610 as formatted local measurements 611, such as described above with respect to donation broadcaster 440 in FIG. 4. Measurement engine 620 is described further below.

Sensor device 600 further includes a transceiver 614 to provide formatted local measurements 611 over a communication channel 650, and to receive communications 615 (e.g., datagrams/data packets) from one or more other sensor devices over communication channel 650.

Sensor device 600 may further include a broadcast listener to listen for datagrams/packets of communications 615, such as described in one or more examples above.

Controller 608 further includes a data extractor 630 to extract remote measurements 616 and metadata 617 from communications 615. In the example FIG. 6, remote measurements 616 include remote measurements 616-1, 616-2, and 616-3 of respective parameters C, D, and E. Extracted metadata 617 includes metadata 617-1, 617-2, and 617-6 of respective remote measurements 616-1, 616-2, and 616-3.

Extracted metadata 617 may include, without limitation, device IDs, sensor specifications (e.g., measurement type/parameter and/or quality information), location information, and/or authentication/security information, such as described in one or more examples above.

Measurement engine 620 is configured to determine a parameter value 624 for one or more parameters of interest (e.g., for one or more of parameters A, B, C, D, and E).

In FIG. 6, measurement engine 620 is configured to determine parameter value 624 for parameter C. Further in FIG. 6, controller 608 receives measurements of parameter C from multiple sources (i.e., measurement 610-3 from local sensor 612-3, and remote measurement 616-1 from a remote sensor).

For such a situation, measurement engine 620 includes a match filter 623 to identify measurements of parameter C amongst local measurements 612 and remote measurements 616. Match filter may, for example, identify local measurement 610-3 based on local sensor information 660, and/or may identify remote measurement 617-1 of parameter C based on extracted metadata 617-1.

Management engine 620 further includes a selection engine 621 to select one or more measurements of parameter C identified by match filter 626.

Selection engine 621 may be configured to select one or more of measurements 610-3 and 617-1 based on local sensor information 660, extracted metadata 617-1, measures of quality computed from measurements of the respective sensors, and/or a policy 622, such as described in one or more examples above.

In an embodiment, selection engine 621 is configured to select one of measurements 610-3 and 617-1 as a selected measurement 652, and measurement engine 620 is configured to output selected measurement 652 as parameter value 624 to a reporting engine 626, such as described in one or more examples above.

Where controller 608 receives a measurement of parameter C from one or more additional sensor devices, selection engine 652 may be configured to select a subset of multiple measurements of parameter C as selected measurements 652, and measurement engine 620 may be configured to compute parameter value 624 based on the multiple selected measurements 652, such as described in one or more examples herein.

A selection engine 621 may be configured as described below with respect to FIG. 7. Selection engine 621 is not, however, limited to the example of FIG. 7.

Figure 7:
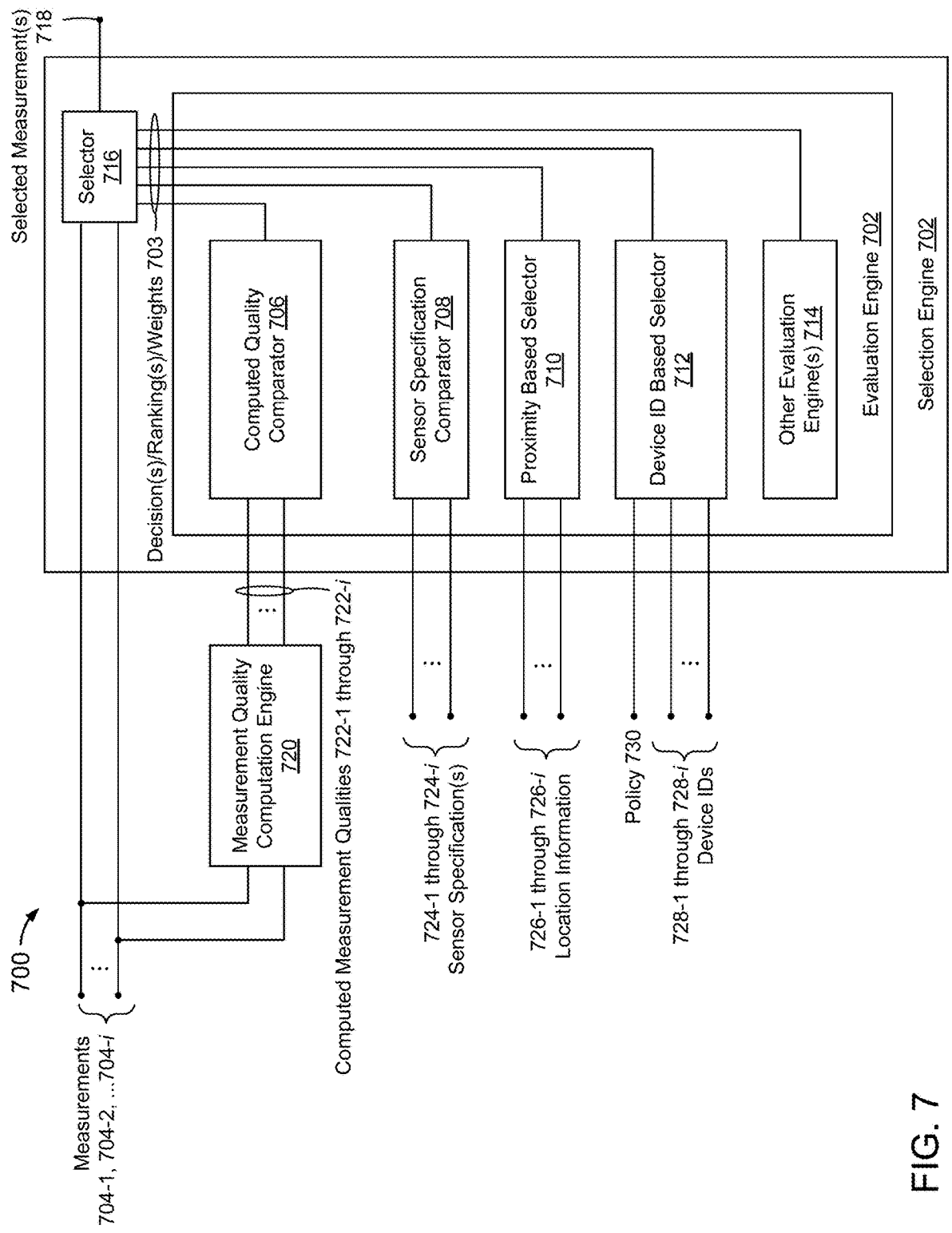
FIG. 7 is a block diagram of a measurement engine that includes a selection engine to select a subset of one or more measurements of a parameter based on information regarding sensors of the respective measurements, measures of quality computed from measurements of respective sensors, and/or one or more policies.

FIG. 7 is a block diagram of a measurement engine 700 that includes a selection engine 702 to select a subset of one or more measurements 704 of a parameter based on information regarding sensors of the respective measurements, measures of quality computed from measurements of respective sensors, and/or one or more policies.

Measurement 704-1 may represent a measurement of a local sensor and measurements 704-2 through 704-*i* may represent measurements of respective remote sensor, such as described in one or more examples above.

Measurement engine 700 may be configured to receive local measurement 702-1 and information related to a respective local sensor, such as illustrated in FIG. 6

Measurement engine 700 may include a data extractor to extract remote measurements 704-2 through 704-*i* and information regarding respective remote sensors from metadata from communications received from the respective remote sensor devices, such as described in one or more examples above.

Measurement engine 700 may further include a match filter to identify measurements 704 as measurements of a parameter of interest, such as described in one or more examples above.

In FIG. 7, selection engine 702 includes a selector 716 to select a subset of measurements 704 as selected measurement(s) 718, based on decision(s)/ranking(s)/weights 703 of an evaluation engine 705.

Selected measurement(s) 718 may represent measurement(s) deemed (directly or indirectly), to be of the highest quality (e.g., with respect to accuracy, precision, and/or other measure of quality), amongst measurements 704.

In the example of FIG. 7, evaluation engine 705 includes multiple modules or engines, each to identify a subset of measurements 704 and/or to rank measurements 704 based on respective evaluation techniques. In another embodiment(s), selection engine 705 may include a subset of the evaluation engines illustrated in FIG. 7, and/or other evaluation engine(s) 714.

Selection engine 702 may be configurable (e.g., by a user/administrator), to apply one or more of the multiple evaluation techniques to a set of measurement 704. Selection engine 702 may be configurable for each of multiple parameters of interest. Selection engine 702 may, for example, be configured to receive measurements of multiple parameters (e.g., temperature measurements and humidity measurements). In this example, selection engine 702 may be configurable to select a subset of temperature measurements based on a first set of one or more evaluation techniques, and to select a subset of humidity measurements based on a second set of one or more evaluation techniques.

In FIG. 7, selection engine 702 includes a measurement quality computation engine 720 to compute a measurement quality 722 for each of the local and remote sensor devices based on measurements provided by the respective sensor devices, such as described in one or more examples above. In this example, evaluation engine 705 includes a comparator 706 to determine which of the local and remote sensor devices has the highest computed quality 722, and/or rank to the local and remote sensors based on the respective computed measurement qualities 722.

Evaluation engine 705 further includes a sensor specification comparator 708 to compare specifications 724-1 through 724-*i* of the respective local and remote sensor devices. Specifications 724 may relate to qualities of respective measurements 704, such as described in one or more examples above. In this example, comparator 708 may be configured to identify a highest quality one of the local and remote sensors, and/or to rank the local and remote sensors based on the respective specifications.

Evaluation engine 705 further includes a proximity-based selector 710 to evaluate location information 726 of the local and remote sensor devices, and identify the remote sensor device this located closest to the local sensor device, and/or to rank the remote sensor devices based on proximities of the respective remote sensor devices to the local sensor device.

Evaluation engine 705 further includes a device ID based selector 712 to select one or more of the local and remote sensor devices, and/or to rank the local and remote sensor devices, based on device IDs 728 of the respective sensor devices and a policy 730. Policy 730 may be configurable to favor one of the local or remote sensor devices over other ones of the sensor devices.

Figure 8:
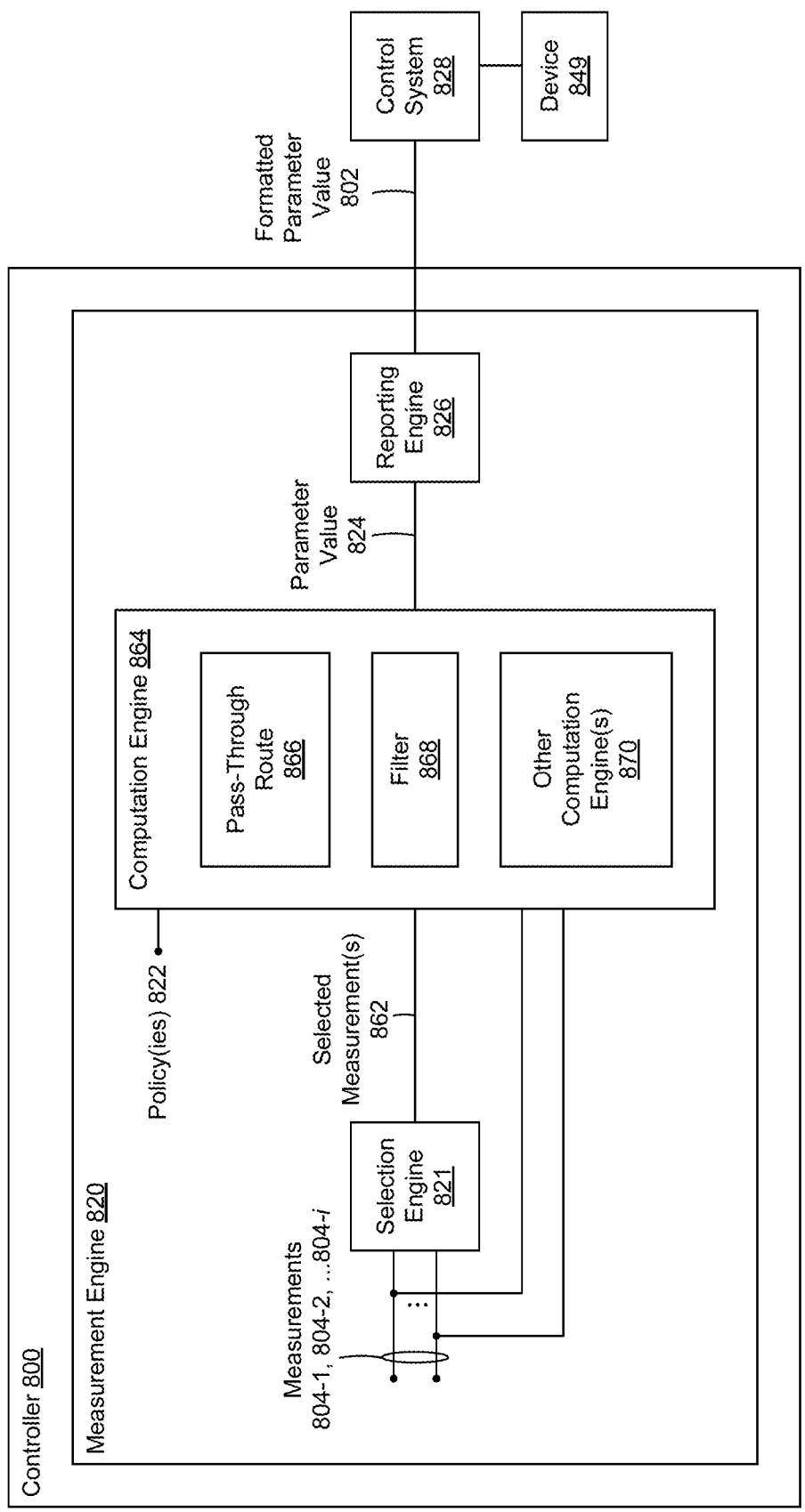
FIG. 8 is a block diagram of a controller to determine a parameter value based on measurements of a parameter received from local and remote sensor devices, and to format the parameter value for a control system.

FIG. 8 is a block diagram of a controller 800 to determine a parameter value 824 based on measurements 804 of a parameter received from local and remote sensor devices, and to format parameter value 824 for a control system 828.

Control system 828 is configured to control a device 849 based at least in part on formatted parameter value 802, such as described in one or more examples above.

Controller 800 includes a management engine 820 that includes a selection engine 821 to select a subset of measurements 804 as selected measurement(s) 862, such as described in one or more examples above. Alternatively, or additionally, selection engine 821 may be configured to rank or weight measurements 804, such as described above with reference to FIG. 7. In this example, selected measurement(s) 862 may include rankings or weights of measurements 804.

Management engine 820 further includes a computation engine 864 to determine parameter value 824 based on selected measurement(s) 862.

Where selected measurement(s) 862 include multiple measurements, computation engine 864 may be configured to compute parameter value 824 based on one or more computation techniques and/or algorithms. Computation engine 864 may be configurable (e.g., by a user/administrator), to utilize one or more of multiple computation techniques and/or algorithms.

Computation engine 864 may be configurable for each of multiple parameters. Computation engine 864 may, for example, be configured to compute a parameter value 824 for each of multiple parameters (e.g., a temperature parameter and a humidity parameter). In this example, computation engine 864 may be configurable to compute a temperature parameter based on a first computation technique, and to compute a humidity parameter based on a second computation technique. In another example, computation engine 864 may be configurable to compute a first temperature parameter based on a first computation technique, and to compute a second temperature parameter based on a second computation technique.

In the example of FIG. 8, computation engine 864 includes a pass-through route 866 to output a single selected measurement 862 as parameter value 864 (e.g., to substitute a measurement of a remote sensor device in place of a measurement of a local sensor device).

Computation engine 864 further includes a filter 868 to filter, average, and/or compute a mean of selected measurements 862. Filter 868 may be configured to filter, average, and/or compute a mean of selected measurements 862 of a particular sensor over time (e.g., sequential selected measurements 862), and/or to filter, average, and/or compute a mean of measurements contained within an instance or set of selected measurements 862 (i.e., filter, average, and/or compute a mean of measurements of multiple sensors).

Computation engine 864 may include one or more other computation techniques/algorithms 870.

Controller 800 may be configurable to provide all of measurements 804 to computation engine 864 (i.e., to bypass selection engine 821), to permit computation to compute parameter value 824 based on all of measurements 804 (e.g., with filter 868).

Figure 9:
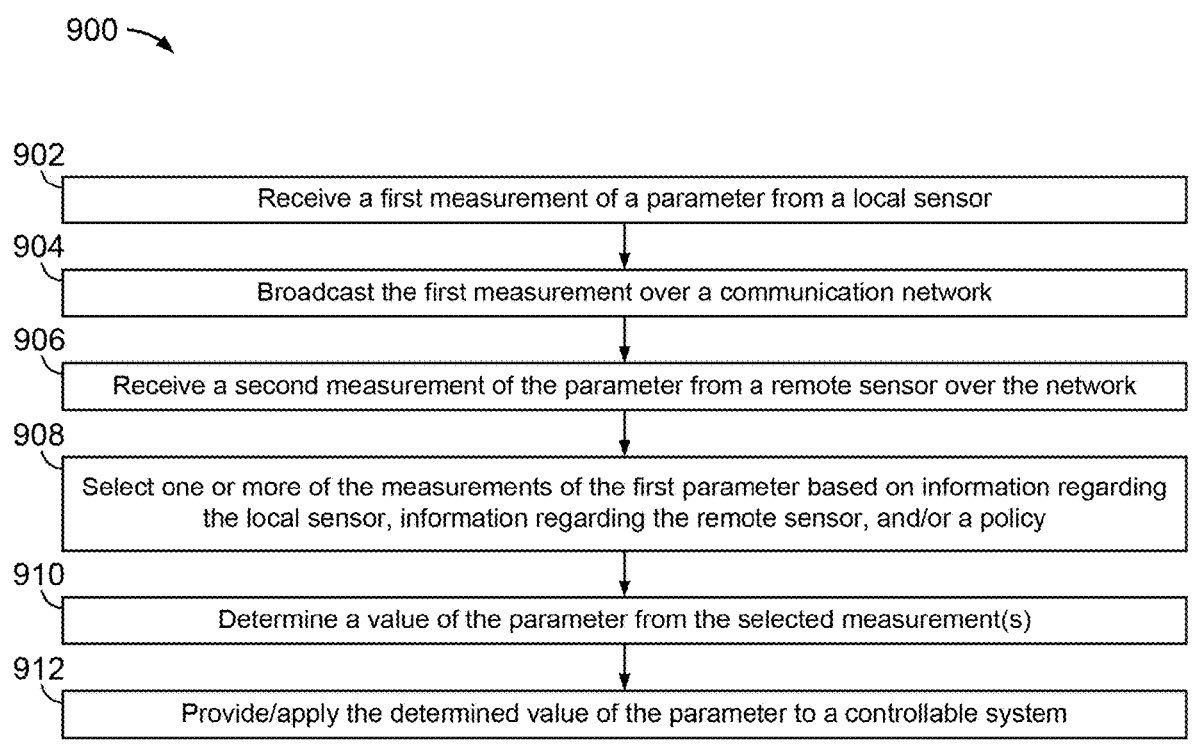
FIG. 9 is a flowchart of a method of exchanging measurements of a parameter amongst sensor devices, selecting one or more of the exchanged measurements, and determining a value of the parameter based on the selected measurement(s).

FIG. 9 is a flowchart of a method 900 of exchanging measurements of a parameter amongst sensor devices, selecting one or more of the exchanged measurements, and determining a value of the parameter based on the selected measurement(s).

At 902, a first measure of the parameter is received from a (local) sensor of a first sensor device, such as described in one or more examples herein.

At 904, the first measurement is provided to one or more other sensor devices over a communication channel, such as described in one or more examples herein.

At 906, a one or more additional measurements of the parameter are received over the communication channel, such as described in one or more examples herein.

At 908, one or more of the measurements of the parameter are selected based on information regarding respective sensor devices (e.g., specifications related to sensor/measurement quality), measurement qualities computed from measurements of the respective sensor devices, and/or a policy, such as described in one or more examples herein.

At 910, a value of the parameter is determined from the selected measurement(s), such as described in one or more examples herein.

At 912, the determined value of the parameter is provided and/or applied to a controllable system, such as described in one or more examples herein.

One or more features disclosed herein may be configure in circuitry, a machine, a computer system, a processor and memory, a computer program encoded within a computer-readable medium, and/or combinations thereof. Circuitry may include discrete and/or integrated circuitry, application specific integrated circuitry (ASIC), a system-on-a-chip (SOC), and combinations thereof.

Information processing by software may be concretely realized by using hardware resources.

Figure 10:
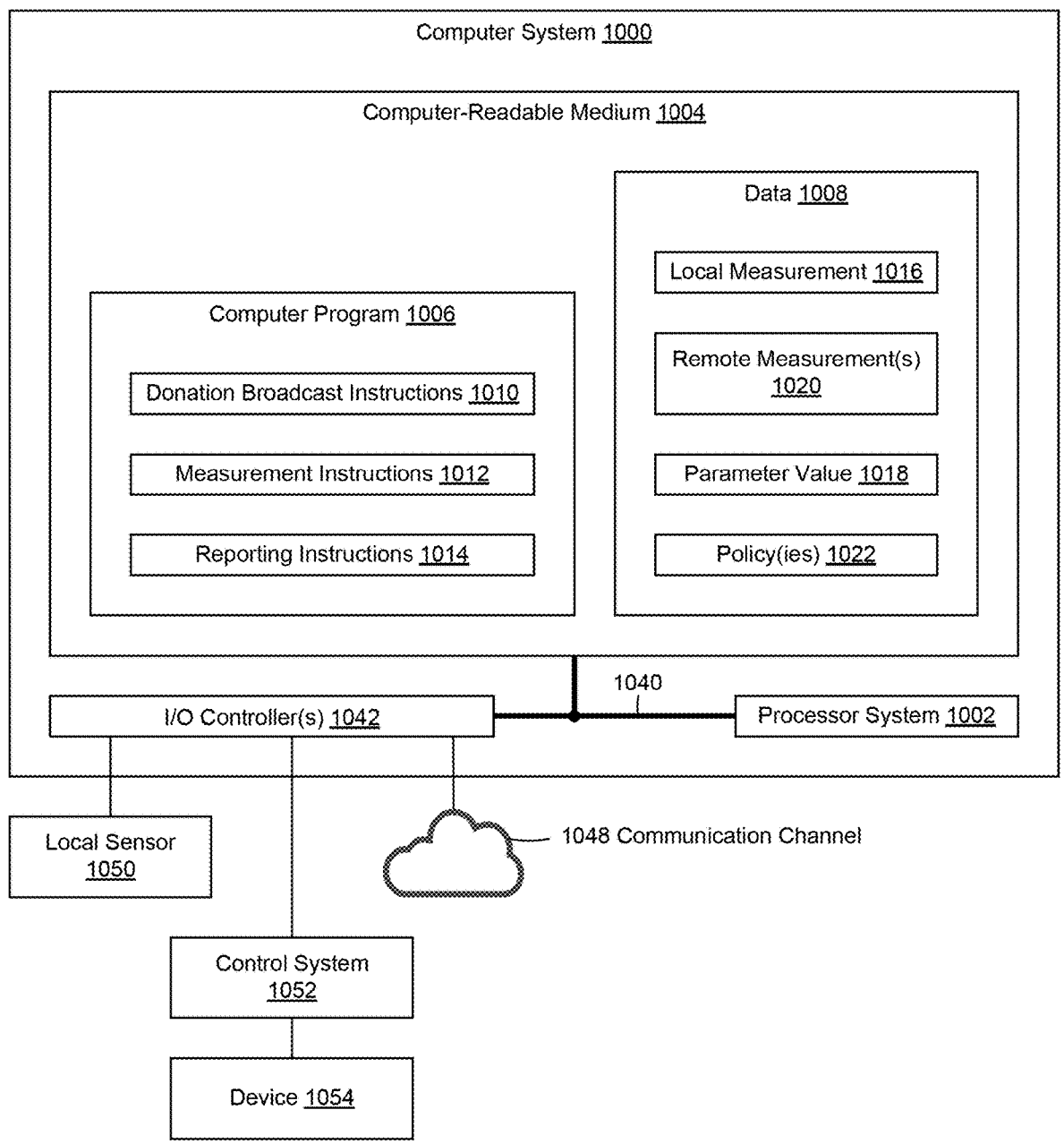
FIG. 10 is a block diagram of a computer system configured to exchange measurements of a parameter over a communication, and to determine a parameter value of the parameter based on one or more of the exchanged measurements.

FIG. 10 is a block diagram of a computer system 1000, configured to exchange measurements of a parameter over a communication 1048, and to determine a parameter value 1018 of the parameter based on one or more of the exchanged measurements of the parameter.

Computer system 1000 may represent an example embodiment or implementation of a controller as described in one or more examples herein, or a portion thereof.

Computer system 1000 includes one or more processors, illustrated here as a processor 1002, to execute instructions of a computer program 1006 encoded within a computer-readable medium 1004. Medium 1004 may include a transitory or non-transitory computer-readable medium.

Computer-readable medium 1004 further includes data 1008, which may be used by processor 1002 during execution of computer program 1006, and/or generated by processor 1002 during execution of computer program 1006.

In the example of FIG. 10, computer program 1006 includes donation broadcast instructions 1010 cause processor 1002 to select and/or format a local measurement 1016 of a parameter received from a local sensor 1050, over a communication channel 1048, such as described in one or more examples herein.

Computer program 1006 further includes measurement instructions 1012 to cause processor 1002 to select one or more measurements of the parameter from amongst local measurement 1016 and one or more remote measurements 1020 of the parameter received over communication channel 1048, and to determine a value 1018 of the parameter based on the selected measurement(s), such as described in one or more examples herein.

Computer program 1006 further includes reporting instructions 1014 to cause processor 1002 to format parameter value 1018 for a control system 1052, which is configured to control a device 1054, such as described in one or more examples herein.

Computer system 1000 further includes communications infrastructure 1040 to communicate amongst devices and/or resources of computer system 1000.

Computer system 1000 further includes one or more input/output (I/O) devices and/or controllers 1042 to interface with one or more other systems, such as local sensor 1050, control system 1052, and communication channel 1048.

Methods and system described herein may be used to configure a measurements exchange protocol/network/environment/apparatus to permit co-located sensor devices (e.g., IoT devices/sensors) to utilize the highest quality (e.g., with respect to accuracy, precision, sensitivity, error, measurement frequency, sensor location and/or other measure(s) of quality) available data. A sensor device may substitute a measurement shared by a peer device(s) in place of a local measurement, and/or compute a value from multiple measurements (e.g., local and/or peer-provided measurements). Metadata may be used to select a measurement(s) and/or to increase reliability/trust of exchanged data. In this way, each peer sensor device of an exchange group may obtain the highest quality measurement of all available co-located sensors without the need for additional significant processing or cloud connectivity.

Examples

The following examples pertain to further embodiments.

An Example 1 is an apparatus that includes a first controller configured to receive a first measurement of a parameter from a first sensor associated with the first controller, broadcast the first measurement to one or more other controllers over a communication network, receive a second measurement of the parameter from a second sensor in a broadcast of a second controller over the communication network, select one or more of the measurements of the parameter based on one or more of information regarding the first sensor, information regarding the second sensor, and a policy, determine a value of the parameter from the one or more selected measurements, and provide the determined value of the parameter to a controllable system.

In an Example 2, the first controller is further configured to extract the information regarding the second sensor from metadata of the broadcast of the second controller, and select the one or more of the measurements of the parameter based at least in part on the extracted information regarding the second sensor.

In an Example 3, the first controller is further configured to extract an identifier of the second sensor from the metadata, and select one or more of the measurements of the parameter based at least in part on the identifier of the second sensor and a policy.

In an Example 4, the first controller is further configured to extract measurement quality information regarding the second sensor from the metadata, and select one or more of the measurements of the parameter based at least in part on a comparison of the extracted measurement quality information of the second sensor and measurement quality information of the first sensor.

In an Example 5, the extracted measurement quality information includes one or more of a measurement precision and a measurement frequency of the second sensor.

In an Example 6, the first controller is further configured to determine a proximity of the second sensor relative to the first sensor, and select one or more of the measurements of the parameter based at least in part on the proximity.

In an Example 7, the first controller is further configured to receive a third measurement of the parameter from a third sensor in a broadcast of a third controller over the communication network, determine a proximity of each of the second and second sensors relative to the first sensor, and select one or more of the measurements of the parameter based at least in part on the proximities of the second and third sensors.

In an Example 8, the first controller is further configured to receive measurements of multiple parameters over the communication network, and identify the second measurement of the parameter from amongst the measurements of multiple parameters based on metadata associated with the respective measurements.

In an Example 9, the first controller is further configured to select one of measurements of the parameter as the determined value of the parameter.

In an Example 10, the first controller is further configured to select multiple measurements of the parameter, and compute the determined value of the parameter from the multiple measurements.

In an Example 11, the first controller is further configured to permit a user to configure the first controller to select the one or more measurements of the parameter based on one of multiple user-selectable techniques.

In an Example 12, the first controller is further configured to permit a user to configure the first controller to determine the value of the parameter based on one of multiple user-selectable techniques.

In an Example 13, the first controller is further configured to authenticate the second controller based on a communication from the second controller, and execute an application program in an access-protected region of memory to select the one or more of the first and second measurements, compute the value of the parameter, and/or authenticate the second controller in the access-protected region of memory.

An Example 14 is a non-transitory computer readable medium encoded with a computer program that includes instructions to cause a first controller to receive a first measurement of a parameter from a first sensor associated with the first controller, broadcast the first measurement to one or more other controllers over a communication network, receive a second measurement of the parameter from a second sensor in a broadcast of a second controller over the communication network, select one or more of the measurements of the parameter based on one or more of information regarding the first sensor, information regarding the second sensor, and a policy, determine a value of the parameter from the one or more selected measurements and provide the determined value of the parameter to a controllable system.

In an Example 15, the non-transitory computer readable medium further includes instructions to cause the first controller to extract the information regarding the second sensor from metadata of the broadcast of the second controller, and select the one or more of the measurements of the parameter based at least in part on the extracted information regarding the second sensor.

In an Example 16, the non-transitory computer readable medium further includes instructions to cause the first controller to extract an identifier of the second sensor from the metadata, and select one or more of the measurements of the parameter based at least in part on the identifier of the second sensor and a policy.

In an Example 17, the non-transitory computer readable medium further includes instructions to cause the first controller to extract measurement quality information regarding the second sensor from the metadata, and select one or more of the measurements of the parameter based at least in part on a comparison of the extracted measurement quality information of the second sensor and measurement quality information of the first sensor.

In an Example 18, the extracted measurement quality information includes one or more of a measurement precision and a measurement frequency of the second sensor.

In an Example 19, the non-transitory computer readable medium further includes instructions to cause the first controller to determine a proximity of the second sensor relative to the first sensor, and select one or more of the measurements of the parameter based at least in part on the proximity.

In an Example 20, the non-transitory computer readable medium further includes instructions to cause the first controller to receive a third measurement of the parameter from a third sensor in a broadcast of a third controller over the communication network, determine a proximity of each of the second and second sensors relative to the first sensor, and select one or more of the measurements of the parameter based at least in part on the proximities of the second and third sensors.

In an Example 21, the non-transitory computer readable medium further includes instructions to cause the first controller to receive measurements of multiple parameters over the communication network, and identify the second measurement of the parameter from amongst the measurements of multiple parameters based on metadata associated with the respective measurements.

In an Example 22, the non-transitory computer readable medium further includes instructions to cause the first controller to select one of measurements of the parameter as the determined value of the parameter.

In an Example 23, the non-transitory computer readable medium further includes instructions to cause the first controller to select multiple measurements of the parameter, and compute the determined value of the parameter from the multiple measurements.

In an Example 24, the non-transitory computer readable medium further includes instructions to cause the first controller to permit a user to configure the first controller to select the one or more measurements of the parameter based on one of multiple user-selectable techniques.

In an Example 25, the non-transitory computer readable medium further includes instructions to cause the first controller to permit a user to configure the first controller to determine the value of the parameter based on one of multiple user-selectable techniques.

In an Example 26, the non-transitory computer readable medium further includes instructions to cause the first controller to authenticate the second controller based on a communication from the second controller, and execute an application program in an access-protected region of memory to select the one or more of the first and second measurements, compute the value of the parameter, and/or authenticate the second controller in the access-protected region of memory.

An Example 27 is a method performed at a first controller, including receiving a first measurement of a parameter from a first sensor associated with the first controller, broadcasting the first measurement to one or more other controllers over a communication network, receiving a second measurement of the parameter from a second sensor in a broadcast of a second controller over the communication network, selecting one or more of the measurements of the parameter based on one or more of information regarding the first sensor, information regarding the second sensor, and a policy, determining a value of the parameter from the one or more selected measurements, and providing the determined value of the parameter to a controllable system.

In an Example 28, the method further includes extracting the information regarding the second sensor from metadata of the broadcast of the second controller, and the selecting includes selecting one or more of the measurements of the parameter based at least in part on the extracted information regarding the second sensor.

In an Example 29, the extracting includes extracting an identifier of the second sensor from the metadata, and the selecting further includes selecting one or more of the measurements of the parameter based at least in part on the identifier of the second sensor and a policy.

In an Example 30, the extracting includes extracting measurement quality information regarding the second sensor from the metadata, and the selecting further includes selecting one or more of the measurements of the parameter based at least in part on a comparison of the extracted measurement quality information of the second sensor and measurement quality information of the first sensor.

In an Example 31, the measurement quality information includes one or more of a measurement precision and a measurement frequency of the second sensor.

In an Example 32, the method further includes determining a proximity of the second sensor relative to the first sensor, and the selecting includes selecting select one or more of the measurements of the parameter based at least in part on the proximity.

In an Example 33, the method further includes receiving a third measurement of the parameter from a third sensor in a broadcast of a third controller over the communication network, and determining a proximity of each of the second and second sensors relative to the first sensor, and the selecting includes selecting one or more of the measurements of the parameter based at least in part on the proximities of the second and third sensors.

In an Example 34, the method further includes receiving measurements of multiple parameters over the communication network, and identifying the second measurement of the parameter from amongst the measurements of multiple parameters based on metadata associated with the respective measurements.

In an Example 35, the selecting includes selecting one of measurements of the parameter as the determined value of the parameter.

In an Example 36, the selecting includes selecting multiple measurements of the parameter and the determining includes computing the value of the parameter from the multiple measurements.

In an Example 37, the method further includes permitting a user to configure the first controller to select the one or more measurements of the parameter based on one of multiple user-selectable techniques.

In an Example 38, the method further includes permitting a user to configure the first controller to determine the value of the parameter based on one of multiple user-selectable techniques.

In an Example 39, the method further includes authenticating the second controller based on a communication from the second controller, and executing an application program in an access-protected region of memory to select the one or more of the first and second measurements, compute the value of the parameter, and/or authenticate the second controller in the access-protected region of memory.

An Example 40 is an apparatus configured to perform the method of any one of Examples 27-39.

An Example 41 is an apparatus that includes means for performing the method of any one of Examples 27-39.

An Example 42 is a machine to perform the method of any of Examples 27-39.

An Example 43 is at least one machine-readable medium comprising a plurality of instructions that, when executed on a computing device, cause the computing device to carry out a method according to any one of Examples 27-39.

An Example 44 is a communications device arranged to perform the method of any one of Examples 27-39.

An Example 45 is a computer system to perform the method of any of Examples 27-39.

An Example 46 is a computing device comprising a chipset according to any one of Examples 27-39

An Example 47 is an apparatus, comprising, a first controller that includes means for receiving a first measurement of a parameter from a first sensor associated with the first controller, means for broadcasting the first measurement to one or more other controllers over a communication network, means for receiving a second measurement of the parameter from a second sensor in a broadcast of a second controller over the communication network, means for selecting one or more of the measurements of the parameter based on one or more of information regarding the first sensor, information regarding the second sensor, and a policy, means for determining a value of the parameter from the one or more selected measurements, and means for providing the determined value of the parameter to a controllable system.

In an Example 48, the first controller further includes means for extracting the information regarding the second sensor from metadata of the broadcast of the second controller, and the means for selecting includes means for selecting one or more of the measurements of the parameter based at least in part on the extracted information regarding the second sensor.

In an Example 49, the means for extracting includes means for extracting an identifier of the second sensor from the metadata, and the means for selecting further includes means for selecting one or more of the measurements of the parameter based at least in part on the identifier of the second sensor and a policy.

In an Example 50, the means for extracting includes extracting measurement quality information regarding the second sensor from the metadata, and the means for selecting further includes means for selecting one or more of the measurements of the parameter based at least in part on a comparison of the extracted measurement quality information of the second sensor and measurement quality information of the first sensor.

In an Example 51, the measurement quality information includes one or more of a measurement precision and a measurement frequency of the second sensor.

In an Example 52, the first controller further includes means for determining a proximity of the second sensor relative to the first sensor, and the means for selecting includes means for selecting select one or more of the measurements of the parameter based at least in part on the proximity.

In an Example 53, the first controller further includes means for receiving a third measurement of the parameter from a third sensor in a broadcast of a third controller over the communication network, and means for determining a proximity of each of the second and second sensors relative to the first sensor, and the means for selecting includes means for selecting one or more of the measurements of the parameter based at least in part on the proximities of the second and third sensors.

In an Example 54, the first controller further includes means for receive measurements of multiple parameters over the communication network, and means for identifying the second measurement of the parameter from amongst the measurements of multiple parameters based on metadata associated with the respective measurements.

In an Example 55, the means for selecting includes means for selecting one of measurements of the parameter as the determined value of the parameter.

In an Example 56, the means for selecting includes means for selecting multiple measurements of the parameter, and the means for determining includes means for computing the value of the parameter from the multiple measurements.

In an Example 57, the first controller further includes means for permitting a user to configure the first controller to select the one or more measurements of the parameter based on one of multiple user-selectable techniques.

In an Example 58, the first controller further includes means for permitting a user to configure the first controller to determine the value of the parameter based on one of multiple user-selectable techniques.

In an Example 59, the first controller further includes means for authenticating the second controller based on a communication from the second controller, and means for executing an application program in an access-protected region of memory to select the one or more of the first and second measurements, compute the value of the parameter, and/or authenticate the second controller in the access-protected region of memory.

An Example 60 is an apparatus that includes a controller configured to receive a first measurement of a parameter from a first sensor associated with the controller, transmit the first measurement over a communication network, receive one or more additional measurements of the parameter from one or more additional sensors in over the communication network, select one or more of the measurements of the parameter based on one or more of specifications of the respective sensors and measures of quality computed from measurements of the respective sensors and determine a value of the parameter from the one or more selected measurements.

In an Example 61, the controller is further configured to extract specifications of the one or more additional sensors from metadata of the respective one or more additional measurements, and select the one or more measurements of the parameter based on a specification of the first sensor and the extracted specifications of the one or more additional sensors.

In an Example 62, the controller is further configured to extract a device identifier of each of the one or more additional sensors from the respective metadata, and select the one or more measurements of the parameter based on the extracted device identifier of the one or more additional sensors.

In an Example 63, the controller is further configured to extract a measurement quality specification of each of the one or more additional sensors from the respective metadata, and select the one or more measurements of the parameter based on a comparison of the extracted measurement quality specification of the one or more additional sensors and a corresponding measurement quality specification of the first sensor.

In an Example 64, the extracted measurement quality specification relates to one or more of measurement precision, measurement accuracy, and measurement frequency.

In an Example 65, the controller is further configured to determine a proximity of each of the one or more additional sensors relative to the first sensor, and select the one or more measurements of the parameter based on the proximity of each of the one or more additional sensors.

In an Example 66, the controller is further configured to select a highest quality one of measurements of the parameter as the determined value of the parameter.

In an Example 67, the controller is further configured to select multiple measurements of the parameter based on measures of quality of the respective measurements, and compute the determined value of the parameter from the multiple measurements.

In an Example 68, the controller is further configured to receive measurements of multiple parameters over the communication network, and identify the one or more additional measurements of the parameter from amongst the measurements of multiple parameters based on metadata associated with the respective measurements.

In an Example 69, the controller is further configured to format the first measurement of the parameter as one or more datagrams, broadcast the one or more datagrams over the communication network, listen for datagrams broadcast over the communication network by one or more other controllers, extract the one or more additional measurements of the parameter, and specifications of the one or more additional sensors, from the datagrams broadcast over the communication network by the one or more other controllers, and select the one or more measurements of the parameter based on the extracted specifications of the one or more additional sensors and a corresponding specification of the first sensor.

In an Example 70, the controller is further configured to authenticate each of the one or more additional measurements based on metadata of the respective measurement.

In an Example 71, the controller is further configured to authenticate each of the one or more additional measurements based on metadata of the respective one or more additional measurements in an access-protected region of memory, select the one or more of measurements of the parameter within the access-protected region of memory, and determine the value of the parameter within the access-protected region of memory.

Methods and systems are disclosed herein with the aid of functional building blocks illustrating functions, features, and relationships thereof. At least some of the boundaries of these functional building blocks have been arbitrarily defined herein for the convenience of the description. Alternate boundaries may be defined so long as the specified functions and relationships thereof are appropriately performed. While various embodiments are disclosed herein, it should be understood that they are presented as examples. The scope of the claims should not be limited by any of the example embodiments disclosed herein.

What is claimed is:

1. A sensor device, comprising:
   a first sensor;
   a communication interface to communicate in a peer-to-peer manner with one or more other sensor devices external to the sensor device; and
   a controller coupled to the first sensor to first receive a first measurement of a parameter from the first sensor;
   wherein the controller is further coupled to the communication interface to second receive, via peer-to-peer communication with the one or more other sensor devices, one or more additional measurements of the parameter from the one or more other sensor devices, the one or more additional measurements of the parameter being taken by one or more additional sensors associated with the one or more other sensor devices;
   wherein the controller determines a value of the parameter, based at least in part on the first and the one or more additional measurements received, and outputs the determined value of the parameter to a control system; and
   wherein the control system uses the outputted value of the parameter to control a device.

2. The sensor device of claim 1, wherein to determine the value of the parameter, the controller selects one or more of the first and the one or more additional measurements received, based at least in part on one or more specifications or one or more quality measures of the one or more additional sensors; and determine the value of the parameter from the selected one or more measurements.

3. The sensor device of claim 2, wherein the controller further extracts the one or more specifications of the one or more additional sensors from metadata of the one or more additional measurements.

4. The sensor device of claim 2, wherein the controller further extracts the one or more quality measures of the one or more additional sensors from metadata of the one or more additional measurements.

5. The sensor device of claim 2, wherein the controller further computes the one or more quality measures of the one or more additional sensors from past one or more additional measurements of the parameter received from the one or more other sensor devices.

6. The sensor device of claim 2, wherein the one or more quality measures comprise one or more precision measures, frequency measures, or variability measures.

7. The sensor device of claim 2, wherein the controller further determines one or more proximity measures between the sensor device and the one or more additional sensors; and wherein the controller further selects the one or more of the first and the one or more additional measurements received, based on the one or more proximity measures determined.

8. The sensor device of claim 1, wherein the controller further generates one or more histograms based on the first received first measurement, and wherein the sensor device further comprises a broadcaster coupled to the communication interface to broadcast the one or more histograms for the one or more additional sensors.

9. The sensor device of claim 1, wherein the sensor device further comprises a listener coupled to the controller and the communication interface to receive one or more additional histograms broadcast by the one or more additional sensors, the one or more additional histograms being based at least in part on the one or more additional measurements.

10. The sensor device of claim 1, wherein at least one of the sensor device or the one or more additional sensors is an Internet-of-Thing (IoT) device.

11. The sensor device of claim 1, wherein the parameter is a selected one of temperature, pressure, humidity, light intensity, or motion.

12. A system comprising:
    a controllee device;
    a controller;
    an Internet-of-Thing (IoT) device having a processor, connectivity circuitry, and a first sensor to collect first sensor data of a parameter; and
    a device having a second sensor to collect second sensor data of the parameter, and forward the second sensor data to the IoT device, via peer-to-peer communication with the IoT device;
    wherein the processor determines a value of the parameter based at least in part on the first and the second sensor data of the parameter, and provides the determined value of the parameter to the controller; and wherein the controller controls operation of the controllee device, based at least in part on the value of the parameter provided.

13. The system of claim 12, wherein the connectivity circuitry is first connectivity circuitry, and wherein the device having the second sensor further includes second connectivity circuitry to communicate in a peer-to-peer manner with the IoT device.

14. The system of claim 13, wherein the first and second connectivity circuitry comprise wireless communication interfaces to communicate peer-to-peer, wirelessly, with each other.

15. The system of claim 12, wherein the device having the second sensor is another IoT device.

16. The system of claim 12, wherein the device having the second sensor is a mobile device.

17. The system of claim 12, wherein the system is a fire suppression system, and the IoT device is a smoke or fire detection device.

18. The system of claim 12, wherein the system is an air conditioning system, and the IoT device is a thermostat.

19. An apparatus comprising:
a first plurality of sensors to locally collect a first plurality of sensor data for a first plurality of parameters; and
a controller coupled to the first plurality of sensors, wherein the controller includes:
a data extractor to extract from received peer-to-peer communication a second plurality of sensor data remotely collected by a second plurality of sensors for a second plurality of parameters;
a measurement engine coupled to the data extractor to determine a common parameter between the first and the second plurality of parameters, and on determination of the common parameter, determine a value of the common parameter, based at least in part on a corresponding local sensor data among the first plurality of sensor data for the common parameter, and a corresponding remote sensor data among the second plurality of sensor data for the common parameter; and
a reporting engine coupled to the measurement engine to output the determined value of the common parameter for a control device;
wherein the control device controls a controllee device based at least in part on the outputted value of the common parameter.

20. The apparatus of claim 19, further comprising a transmitter; and wherein the controller further comprises a donation broadcaster coupled with the first plurality of sensors to format the locally collected first plurality of sensor data for the first plurality of parameters, and coupled with the transmitter to broadcast, via the transmitter, the formatted first plurality of sensor data for the first plurality of parameters for other apparatuses.

* * * * *